(12) United States Patent
Li et al.

(10) Patent No.: US 11,921,126 B2
(45) Date of Patent: Mar. 5, 2024

(54) DEVICE WITH BLOCKABLE/UN-BLOCKABLE FLUID CHANNELS AND BUILT-IN SELF-TEST EQUIPMENT

(71) Applicant: Technische Universität München, Munich (DE)

(72) Inventors: Mengchu Li, Munich (DE); Tsun-Ming Tseng, Munich (DE); Ulf Schlichtmann, Munich (DE)

(73) Assignee: Technische Universitat Munchen, Munich (DE)

( * ) Notice: Subject to any disclaimer, the term of this patent is extended or adjusted under 35 U.S.C. 154(b) by 307 days.

(21) Appl. No.: 17/369,587

(22) Filed: Jul. 7, 2021

(65) Prior Publication Data

US 2022/0011329 A1     Jan. 13, 2022

(30) Foreign Application Priority Data

Jul. 10, 2020   (EP) .................................... 20185384

(51) Int. Cl.
| | | |
|---|---|---|
| G01N 33/68 | (2006.01) |
| A01N 1/02 | (2006.01) |
| C07C 309/65 | (2006.01) |
| C07C 309/73 | (2006.01) |
| G01M 3/02 | (2006.01) |
| G01N 1/40 | (2006.01) |
| G01N 21/33 | (2006.01) |
| G01N 21/64 | (2006.01) |
| G01N 33/52 | (2006.01) |
| G01N 33/532 | (2006.01) |
| G01N 33/543 | (2006.01) |
| G01N 33/569 | (2006.01) |
| G01N 35/00 | (2006.01) |
| G01N 35/10 | (2006.01) |

(52) U.S. Cl.
CPC ........ *G01N 35/00623* (2013.01); *G01M 3/02* (2013.01); *G01N 35/1097* (2013.01)

(58) Field of Classification Search
CPC ........ G01N 35/00623; G01N 35/1097; G01M 3/02; B01L 2200/143; B01L 2300/0887; B01L 2300/123; B01L 2400/0487; B01L 2400/0655; B01L 3/502738
See application file for complete search history.

(56) References Cited

U.S. PATENT DOCUMENTS

| | | | |
|---|---|---|---|
| 9,381,512 B2 | 7/2016 | Fluidigm | |
| 2009/0142236 A1* | 6/2009 | Unger | ...................... B01L 3/00 422/130 |
| 2014/0193896 A1* | 7/2014 | Cohen | ................. F16K 99/0026 422/502 |

OTHER PUBLICATIONS

European Search Report dated Dec. 9, 2020, issued in EP Application No. 20185384.3, filed Jul. 10, 2020.

* cited by examiner

*Primary Examiner* — Jennifer Wecker
*Assistant Examiner* — Oyeleye Alexander Alabi
(74) *Attorney, Agent, or Firm* — Workman Nydegger

(57) ABSTRACT

A device includes a plurality of first fluid channels connected to one or more first fluid inlets, a plurality of first valves, each of the first valves having a first control port which allows for blocking or un-blocking a flow through one of the first fluid channels based on a pressure applied to the first valve via the first control port, a plurality of first control channels, each of the first control channels being connected to at least one of the first control ports, and self-test equipment.

25 Claims, 13 Drawing Sheets

DEVICE WITH BLOCKABLE/UN-BLOCKABLE FLUID CHANNELS AND BUILT-IN SELF-TEST EQUIPMENT

CROSS-REFERENCE TO RELATED APPLICATIONS

This application claims priority to EP Application No. 20 185 384.3, filed Jul. 10, 2020, which is incorporated herein by specific reference.

BACKGROUND OF THE INVENTION

1. The Field of the Invention

The present disclosure relates to a device with blockable/un-blockable fluid channels and built-in self-test equipment. In particular, the present disclosure relates to a device for microfluidic chemical and/or biological applications having blockable/un-blockable fluid channels and equipment for performing a self-test to determine whether micro-mechanical valves for blocking/un-blocking the fluid channels can be controlled in accordance with requirements imposed by the application.

2. The Relevant Technology

A device for microfluidic chemical and/or biological applications may comprise a multitude of flow channels and micro-mechanical valves formed in material layers deposited on a substrate (lab on chip). As an application may require a subset or all of the micro-mechanical valves to be operational, it may be desirable to test said micro-mechanical valves before and/or while using the device.

SUMMARY OF THE INVENTION

The present disclosure is directed at a device comprising a plurality of first fluid channels connected to one or more first fluid inlets, a plurality of first valves, each of said first valves having a first control port which allows for blocking or un-blocking a flow through one of the first fluid channels based on a pressure applied to said first valve via said first control port, a plurality of first control channels, each of said first control channels being connected to at least one of said first control ports, and self-test equipment, featuring a plurality of second fluid channels, a plurality of second valves, each of said second valves having a second control port which allows for blocking or un-blocking a flow through one of the second fluid channels based on a pressure applied to said second valve via said second control port, and a plurality of second control channels, each of said second control channels being connected to at least one of said second control ports, wherein each of said first control ports is connected to at least one second control port.

In this regard, the term "channel", as used throughout the description and the claims, particularly refers to a passage confined by a channel wall which has two openings, a first opening at one side of the channel and a second opening at the other side of the channel. In this regard, the formulation that a "control channel is connected to a port", as used throughout the description and the claims, particularly refers to a configuration in which a fluid may flow through the channel towards the port. If the flow through the channel is unidirectional, the fluid always enters the channel through the same side of the channel and exits the channel through the other side of the channel. A channel may have a substantially constant diameter, or a substantially constant height and width. The diameter or the height and width of a fluid channel may be less than 1 mm, less than 100 µm or less than 10 µm. The diameter or the height and width of a control channel may be less than 100 µm, less than 10 µm or less than 1 µm. Moreover, the term "inlet", as used throughout the description and the claims, particularly refers to an opening in a surface of a structure through which a fluid can be supplied to a channel connected to said opening. For instance, the inlet may be an opening in the channel wall.

Moreover, the term "valve", as used throughout the description and the claims, particularly refers to a mechanical device for controlling the flow of a fluid through a channel. In a first embodiment, a valve in a default (non-actuated) state may block a flow of the fluid through the channel. By actuating the valve, the channel may be un-blocked, and the fluid may flow (substantially unobstructed) past/through the valve. In a second embodiment, a valve in a default (non-actuated) state may allow the fluid to flow (substantially unobstructed) past/through the valve. By actuating the valve, the channel may be blocked. In this regard, "a control port which allows for blocking or un-blocking a flow" is to be understood as referring to a port which can be used for actuating the valve. For instance, the valve may open or close upon pressurizing or depressurizing a chamber of the valve which is connected to the port. In this regard, "a pressure applied to said valve via said first control port" is to be understood as the pressure of a fluid in the chamber which can be controlled by feeding fluid through the control port towards the chamber or withdrawing fluid from the chamber towards the control port.

Furthermore, the term "self-test equipment", as used throughout the description and the claims, particularly refers to components of the device which are not used for controlling the flow of a fluid through the first fluid channels but for determining whether it is possible to control the flow of the fluid through the first fluid channels based on pressurizing/depressurizing the first control channels. The self-test may be an indivisible integral part of the device. For example, the first and second fluid channels, the first and second valves, and the first and second control channels may be integrated into a single chip. The chip may comprise a substrate and the first and second fluid channels, the first and second valves and the first and second control channels may be formed in material layers deposited on the substrate. The chip may comprise more than 100 first channels and/or more than 100 first valves.

In this regard, the terms "first", "second", etc. as used throughout the description and claims are primarily intended to differentiate between different groups of elements (e.g., first group, second group, etc.) and shall not be construed as establishing a ranking or order of any kind. However, elements of the same group may serve a similar function or may be formed in a same layer. For example, the first fluid channels may be formed in a first layer (and extend parallelly through a portion of said layer) whereas the first control channels may be formed in a second layer which may be adjacent to (above or below) the first layer. Likewise, the second fluid channels may be formed in the first (or a third) layer (and extend parallelly through said layer) whereas the second control channels may be formed in the second layer (or a fourth layer which may be adjacent to the third layer).

The self-test equipment allows testing whether the first valves can be actuated by pressurizing/depressurizing the first control channels. If one of the first control channels is blocked, the corresponding second control channel will likewise not see an increase/decrease in pressure and hence, the corresponding second valve will not be actuated. If a first control channel leaks to another first control channel, both corresponding second control channels will see an increase/decrease in pressure and hence, the leakage can be detected. The integrated self-test equipment may be particularly beneficial in scenarios where first valves cannot be actuated individually and/or where interdependencies between first valves are prone to mask blocked or leaking first channels. For example, the first fluid channels may be segments of a channel network and fluid flow along a path through the network may require multiple valves to be operated concurrently.

At least one first control port may be connected to multiple second control ports. Said second control ports may form a first group. Each of said multiple second control ports of said first group may allow for blocking or un-blocking a different one of said second fluid channels.

Hence, pressurizing/depressurizing said first control port may, in the absence of defects, block/un-block multiple different second fluid channels. This may reduce the risk of defects being masked.

At least one other first control port may be connected to a second group of multiple second control ports. Each of said multiple second control ports of said second group may allow for blocking or un-blocking a different one of said second fluid channels. Said first group and said second group may differ regarding the second fluid channels which they allow for to be blocked or un-blocked. For example, both of said first group and said second group may allow for at least one second fluid channel to be blocked or un-blocked, which the other group does not allow for to be blocked or un-blocked.

This may ensure that a defect within the first group (or rather within the first control channel to which the control ports of the first group are connected) is not masked by the second group (or rather the first control channel to which the control ports of the second group are connected) and that a defect of the second group is not masked by the first group, if the first control channels to which the groups are connected are tested concurrently. Testing two (or more) first control channels concurrently may reduce the overall time required for testing and may also be necessary, if the two (or more) first control channels cannot be pressurized/depressurized individually.

The second fluid channels may be connected to one second inlet and one second outlet.

Hence, when feeding a fluid into the second inlet, the fluid may flow through each un-blocked second fluid channel towards the second outlet.

Each of said second fluid channels may allow for visual inspection through a transparent wall portion of said second fluid channel.

A visual inspection may allow determining whether a channel is blocked or un-blocked.

There may be no more than n or no more than $\log_2(n+1)$ second fluid channels, with n being the number of first control channels under test.

Reducing the number of second fluid channels may allow reducing the overall size of the device.

The first and second fluid channels and the first and second control channels may be integrated into a single chip.

The device may comprise a fluid manipulation assembly. The fluid manipulation assembly may feature one or more reagents.

The fluid manipulation assembly may feature reaction chambers. A reaction chamber may comprise a reagent or a reagent may be put/flown into the reaction chamber (immediately before or) during the analysis.

A reaction chamber may be formed by a segment of a first fluid channel. The segment may be delimited by two valves.

The fluid manipulation assembly may comprise one or more inlets connected to the reaction chambers which allows mixing different fluids in the reaction chambers. For example, a reaction chamber may be connected to two inlets (and one or more outlets) for mixing two different fluids in the reaction chamber.

An area of a cross-section of the first and second fluid channels and the first and second control channels may be below 1 mm$^2$, below 100 µm$^2$, or below 10 µm$^2$.

The small size of the channels may allow for microfluidic large-scale integration (mLSI).

The present disclosure is further directed at a system comprising the device, the system being configured to pressurize/de-pressurize selected ones of the first control channels, determine which ones of the second fluid channels are blocked and/or which ones of the second fluid channels are un-blocked, by visually detecting absence or presence of fluid flow through said second fluid channels, and detect blockage or leakage regarding said first control channels by comparing an expected absence/presence pattern with an actual absence/presence pattern.

For example, the system may comprise a microscope and an image processing device which analyzes images of the second fluid channels for (signs of) fluid flow.

The present disclosure is even further directed at a method, comprising controlling a pressure within said first control channels of the device in accordance with a test pattern for detecting blockage or leakage of, or between said first control channels, causing a non-transparent liquid to flow through un-blocked ones of said second fluid channels of the device, determining which ones of said second fluid channels are blocked and/or which ones of the second fluid channels are un-blocked, by detecting absence or presence of the non-transparent liquid in said second fluid channels, and detecting blockage or leakage regarding said first control channels by comparing blocked and/or un-blocked ones of said second fluid channels to an expectation given rise to by the test pattern.

In this regard, the term "test pattern", as used throughout the description and the claims, particularly refers to data defining a set of pressure levels to be applied to the first control channels. A test pattern may also comprise a sequence of different sets to be applied one after the other.

BRIEF DESCRIPTION OF THE DRAWINGS

The foregoing aspects and many of the attendant advantages will become more readily appreciated as the same becomes better understood by reference to the following description of embodiments, when taken in conjunction with the accompanying drawings, wherein like reference numerals refer to like parts throughout the various views, unless otherwise specified.

Notably, the drawings are not drawn to scale and unless otherwise indicated, they are merely intended to conceptually illustrate the structures and procedures described herein.

DETAILED DESCRIPTION OF THE PREFERRED EMBODIMENTS

Figure 1:
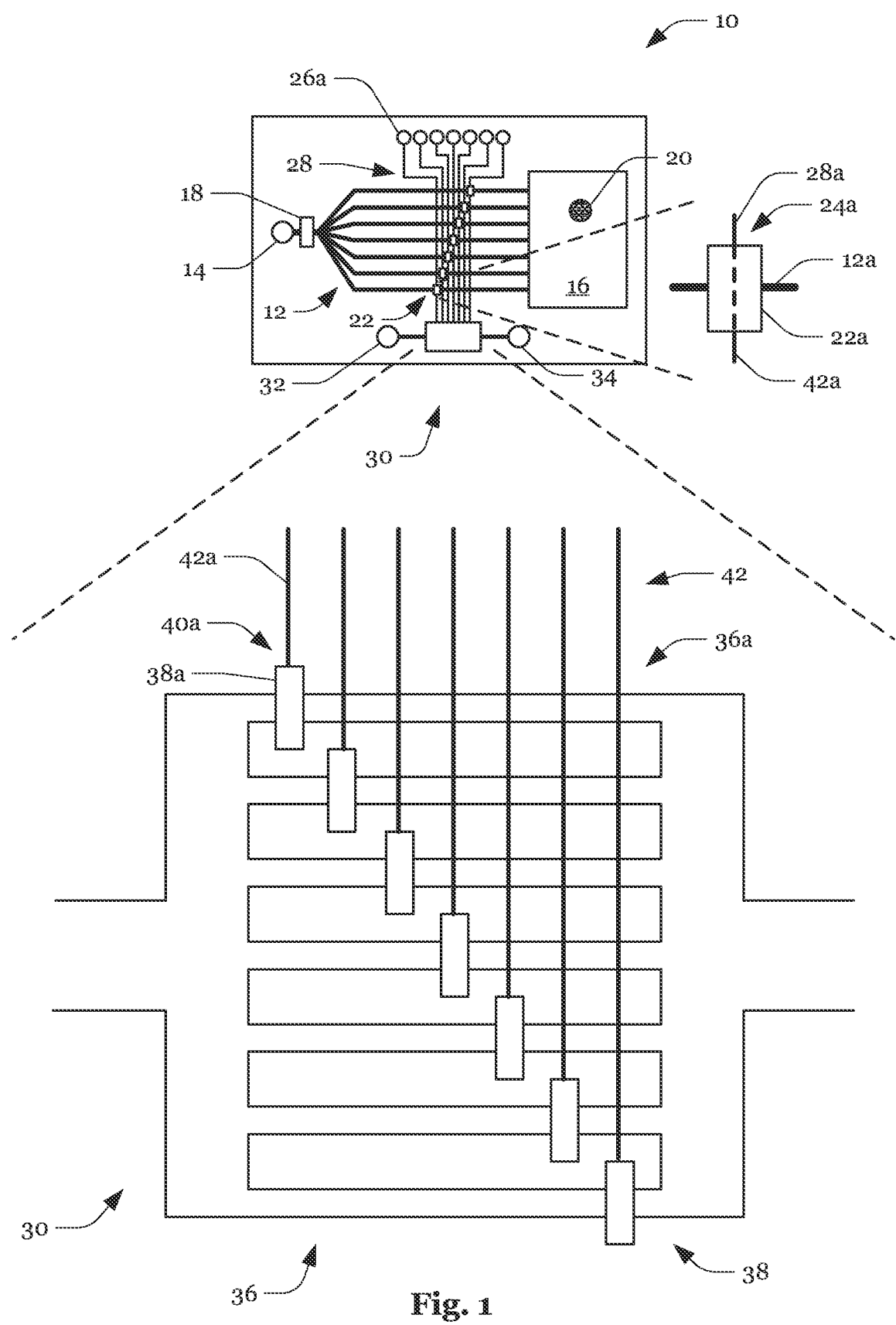
FIG. 1 schematically illustrates features of a device for microfluidic chemical and/or biological applications, according to a first example.

FIG. 1 shows device 10 for microfluidic chemical and/or biological applications. Device 10 has a plurality of fluid channels 12 connecting fluid inlet 14 to fluid manipulation assembly 16. By activating micromechanical pump 18 (or an external pump), a fluid (such as an assay and, in particular, a biochemical assay) may be taken in through fluid inlet 14, distributed onto the fluid channels 12 and fed to fluid manipulation assembly 16. Fluid manipulation assembly 16 may feature one or more reaction chambers (not shown) containing reagents. To this end, a reaction chamber may be provided with a reagent by a manufacturer during production (with the reagent being stored in the chamber for a certain period of time such as a few weeks or months) or by a user (immediately) before use through a reagent inlet (not shown) of manipulation assembly 16. The reaction chamber may also be connected to another inlet for mixing fluids. Each fluid channel 12 may feed a quantity (e.g., less than 1 ml or less than 1 µl per fluid channel 12) of the assay to a different one of the chambers. A cross-sectional area of each of fluid channels 12 may be below 1 mm2, below 100 µm2, or below 10 µm2.

Fluid manipulation assembly 16 further comprises outlet 20. Outlet 20 may be gas permeable and the chambers may be connected to outlet 20 to exhaust gas from the chambers when flowing the assay into the chambers. To control the flow of the assay from inlet 14 to fluid manipulation assembly 16 (and to ensure that the right quantity of essay is fed into each chamber), fluid channels 12 are provided with micromechanical valves 22. Micromechanical valve 22a comprises control port 24a through which gas (or a liquid) can be fed into, or released from, a pressure chamber of micromechanical valve 22a. Increasing the pressure in the pressure chamber closes micromechanical valve 22a, and decreasing the pressure in the pressure chamber opens micromechanical valve 22a. Notably, valve 22a could also be designed such that increasing the pressure in the pressure chamber opens micromechanical valve 22a, and decreasing the pressure in the pressure chamber closes micromechanical valve 22a. Control port 24a is connected to control inlet 26a via control channel 28a such that blocking and un-blocking fluid channel 12a and thus disabling and enabling the flow of the assay from inlet 14 to fluid manipulation assembly 16, can be effected by an external pressure control unit that is connected to control inlet 26a.

The remaining ones of micromechanical valves 22 may be identical (in design) to micromechanical valve 22a. Control channel 28a may be designed for (bidirectional flow of) a gas (or liquid) and fluid channel 12a may be designed for (unidirectional flow of) a liquid. Control channel 28a may be smaller in size than fluid channel 12a and the remaining ones of control channels 28 and fluid channels 12 may be identical in size to control channel 28a and fluid channel 12a, respectively. For example, a cross-sectional area of each of control channels 28 may be below 100 µm2, below 10 µm2 or below 1 µm2.

Device 10 further includes self-test equipment 30. Self-test equipment 30 comprises inlet 32 and outlet 34 which are connected via fluid channels 36. Fluid channels 36 are provided with micromechanical valves 38. Micromechanical valve 38a comprises control port 40a which allows for blocking and un-blocking a flow through fluid channel 36a, based on a pressure applied to micromechanical valve 38a via control port 40a. The remaining ones of micromechanical valves 38 may be identical in design to micromechanical valve 38a. Control port 40a is connected to control port 28a via control channel 42a. In absence of defects, a (pressure) state of each one of control channels 28 is replicated in a corresponding one of control channels 42. Notably, a replication may also be achieved in other ways than connecting control channel 42a to control channel 28a through valve 22a. For example, there may be a junction (e.g., a T-junction or a bifurcation) at which control channel 42a and control channel 28a are connected.

Figure 2:
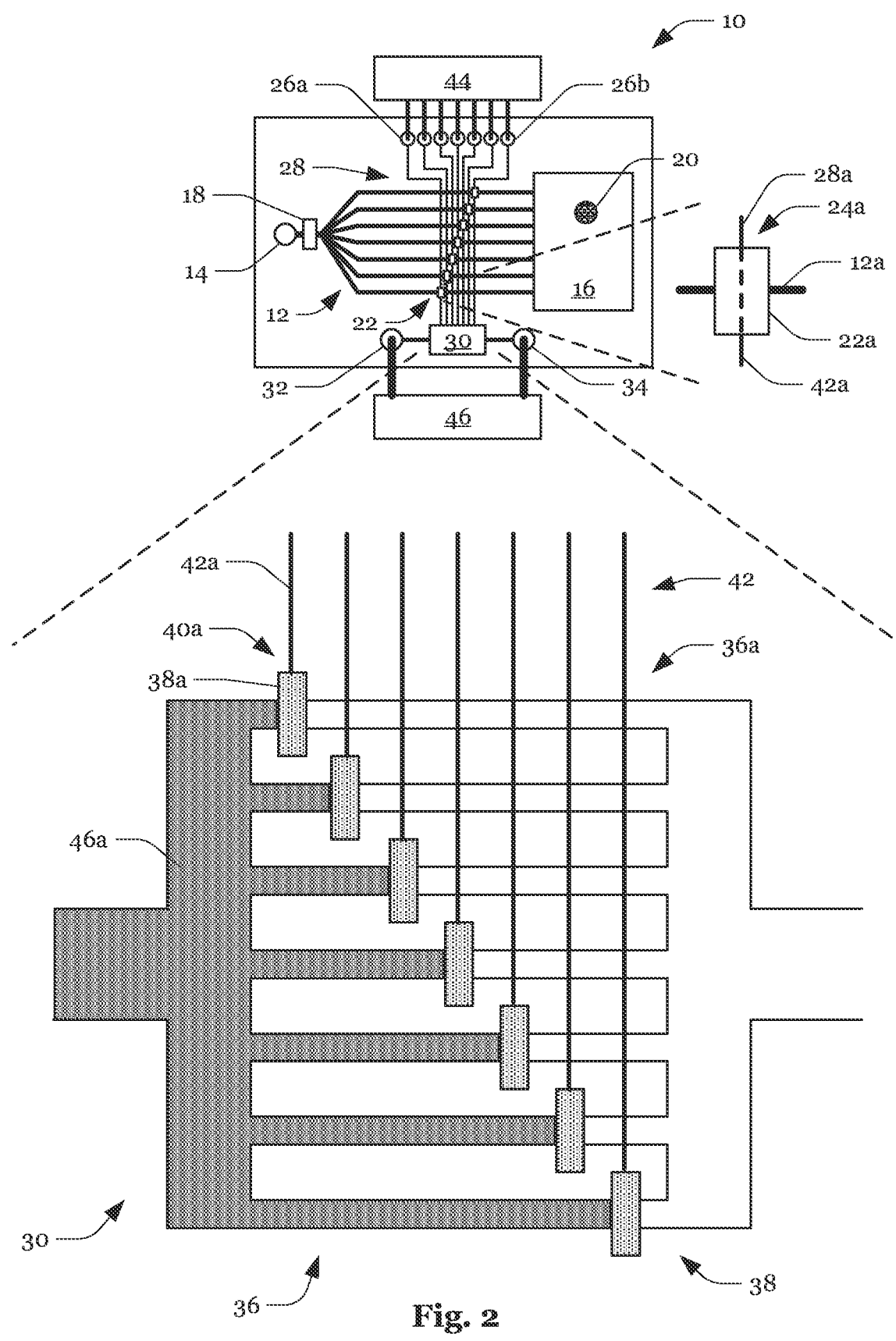
FIG. 2, FIG. 3, FIG. 4, and FIG. 5 schematically illustrate the self-test capability of the device shown in FIG. 1.
Figure 13:
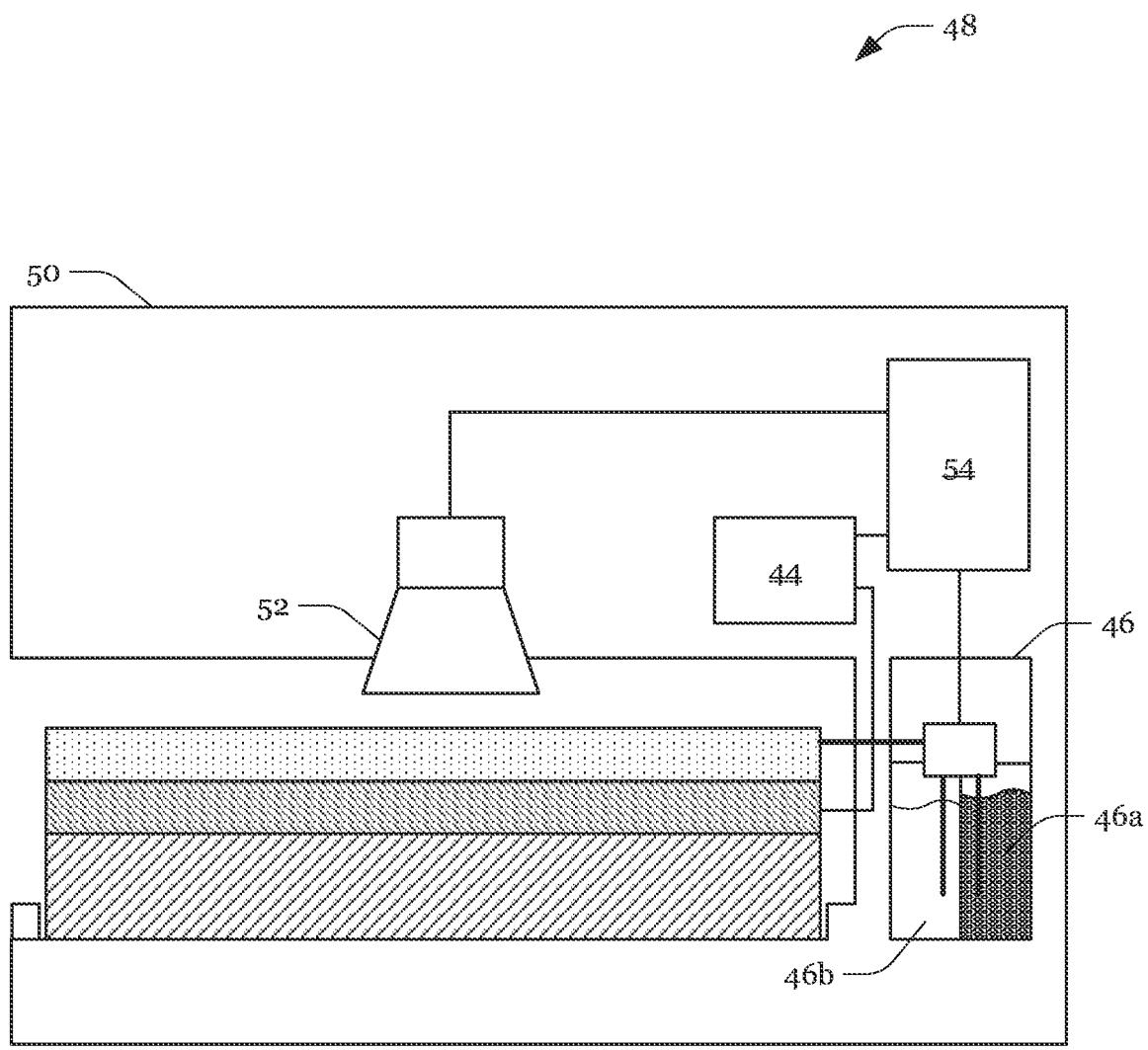
FIG. 13 schematically illustrates features of a system comprising one of the devices.

FIG. 2 schematically illustrates an aspect of the self-test capability of device 10. As shown in FIG. 2, control ports 26a and 26b are connected to pressure control unit 44 and inlet 32 and outlet 34 are connected to reservoir 46. Pressure control unit 44 is enabled to effect individual pressure levels at inlet 26a and inlet 26b. Reservoir 46 contains a non-transparent liquid 46a and a pump for circulating the non-transparent liquid through the un-blocked ones of fluid channels 36. As schematically illustrated in FIG. 13, pressure control unit 44 and reservoir 46 may be part of testing system 48. Testing system 48 may further comprise apparatus 50 into which device 10 can be inserted for testing. Apparatus 50 may comprise digital microscope 52 and image processing device 54. Image processing device 54 may be configured to analyze data provided by digital microscope 52 to determine which ones of fluid channels 36 are blocked and/or which ones of fluid channels 36 are un-blocked.

For example, device 10 may comprise substrate 10a, control layer 10b in which control channels 28 and 42 are formed, and fluid manipulation layer 10c in which fluid channels 12 and 36 are formed. Fluid manipulation layer 10c may be at least partially transparent to allow for inspection of reaction chambers (not shown) and/or fluid channels 36. Digital microscope 52 may provide image data to image processing device 54 and image processing device 54 may analyze the image data to detect the absence or presence of the non-transparent liquid 46a in individual ones of fluid channels 36. Image processing device 54 may also exchange data with pressure control unit 44. For example, image processing device 54 may control pressure control unit 44 regarding which test pattern to apply, or pressure control unit 44 may communicate an applied test pattern to image processing device 54. Image processing device 54 may detect blockage or leakage regarding control channels 28 by comparing blocked and/or un-blocked ones of fluid channels 36 to an expectation given rise to by the applied test pattern.

In a first step, illustrated in FIG. 2, control channels 28 may be tested for blockage. To this end, pressure control unit 44 may effect pressure levels at inlet 26a and inlet 26b which, in absence of defects, cause micromechanical valves 38 to close. After effecting pressure levels at inlet 26a and inlet 26b which, in absence of defects, cause micromechanical valves 38 to close, non-transparent liquid 46a may be pumped towards inlet 32. Because each one of valves 38 is closed, each of fluid channels 36 comprises a portion which is free of non-transparent liquid 46a which indicates that, in absence of leakage, no blockage has occurred. Although leakage may mask blockage, such masked defects may be discovered when testing for leakage as described in the following, and vice versa. Notably, testing may be performed concurrently to using fluid manipulation assembly 16.

Figure 3:
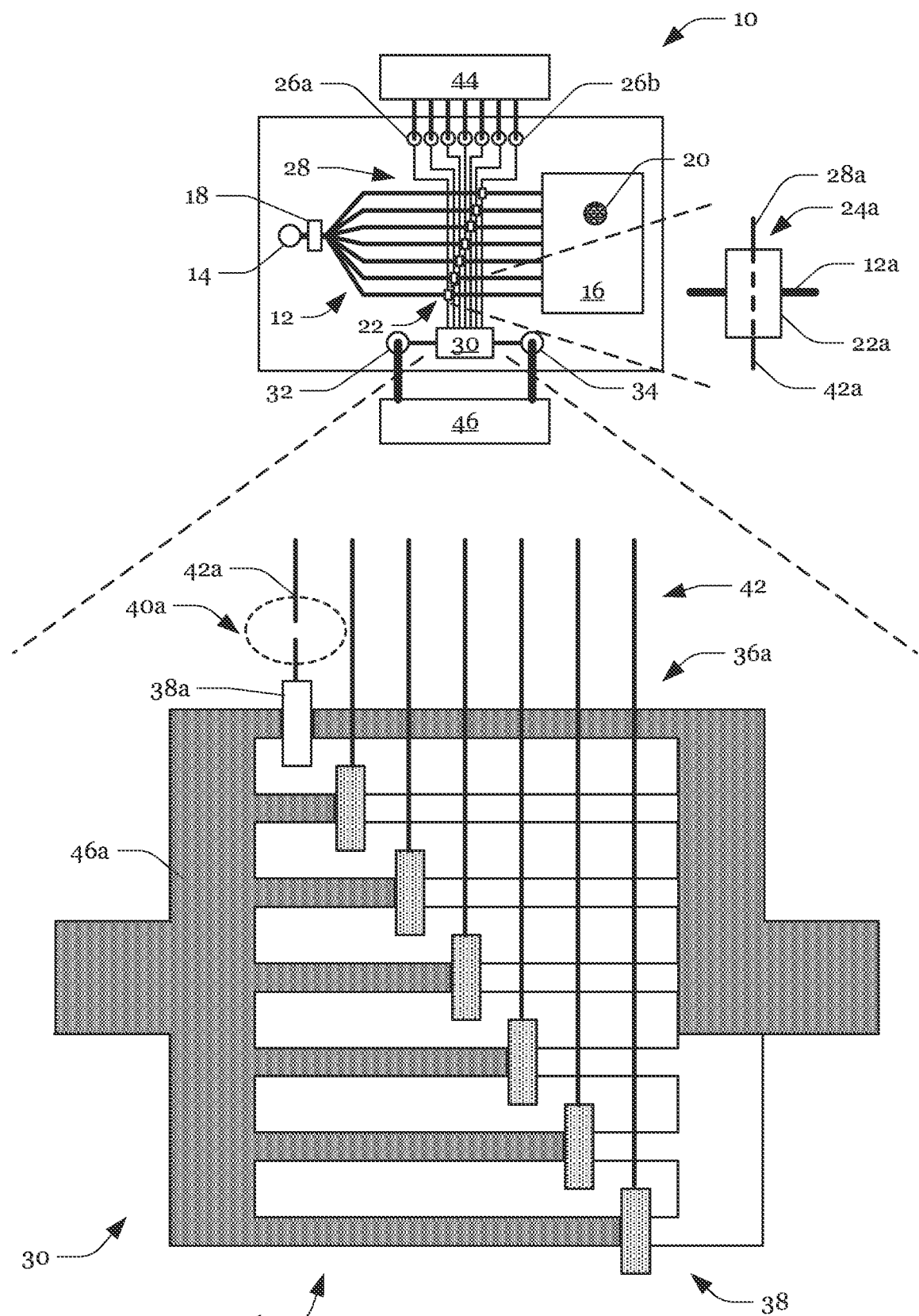

FIG. 3 illustrates a scenario in which control channel 42a is blocked. As a result, non-transparent liquid flows through fluid channel 36a, allowing testing system 48 to detect the blockage and output a warning signal. Warning signal may indicate that a defect has been detected as well as the nature of the defect. Warning signal may be audible, visible or haptic or a combination thereof. Testing system 48 may also record defects and provide the recorded data for statistical analysis. The analyzed data might be used by the manufacturer of device 10 to improve the design or the manufacturing process. The recorded data may also be used as or in support of evidence in a defense against a claim involving an erroneous fluid manipulation that could be caused by device 10 being defective. Likewise, the recorded data may be used to claim a refund from manufacturer or from distributor or to make decisions regarding the supply and/or shipping chain. To this end, testing system 48 may also (visually or by near-field radio communication) detect and record a (unique) identifier of device 10, batch, type and/or manufacturer of device 10.

Moreover, testing system 48 may initiate a "repair process" to remove (or overcome) blockage. For example, testing system 48 may flush fluid channel 36a with transparent liquid 46b, effect a higher pressure-level at inlet 26a and repeat the test. Depending on the nature of the envisaged use of, and/or the redundancy inherent in device 10, device 10 may still be used despite being (partially) defective. To this end, testing system 48 may determine one or more possible usage scenarios for device 10 and/or ensure that device 10 is not used for purposes for which a detected defect would be detrimental. In addition, testing system 48 may ensure that results of fluid manipulation assembly 16 are matched up against any defects that have been detected. In addition, testing system 48 may (individually) rank tested devices, batches, types and/or manufacturers, and use the ranking to assign devices to different usage scenarios. For example, a device, batch, type and/or manufacturer that shows superior quality may be assigned to a comparatively more critical use whereas a device, batch, type and/or manufacturer that shows lower quality may be assigned to a comparatively less critical use.

Figure 4:
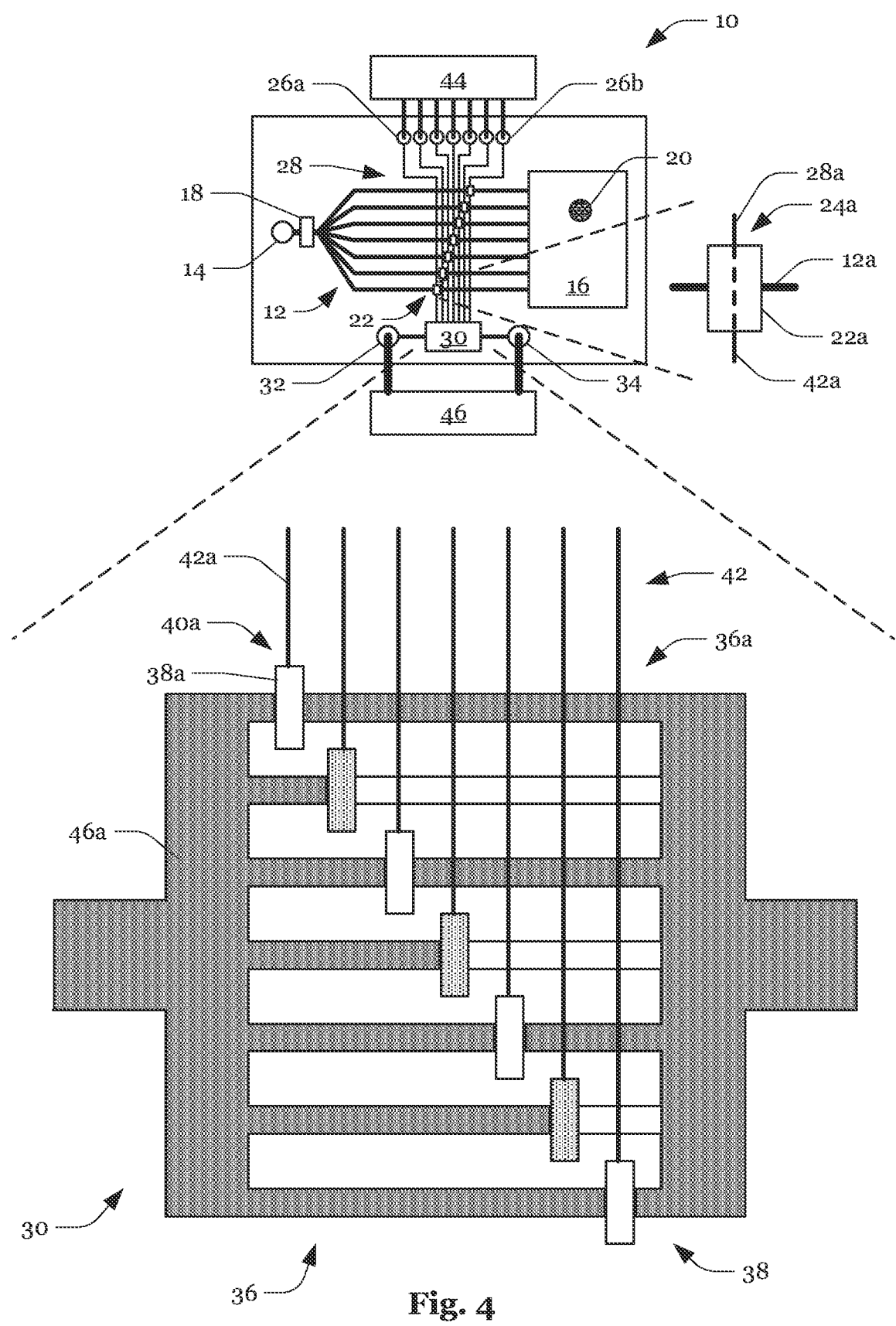
Figure 5:
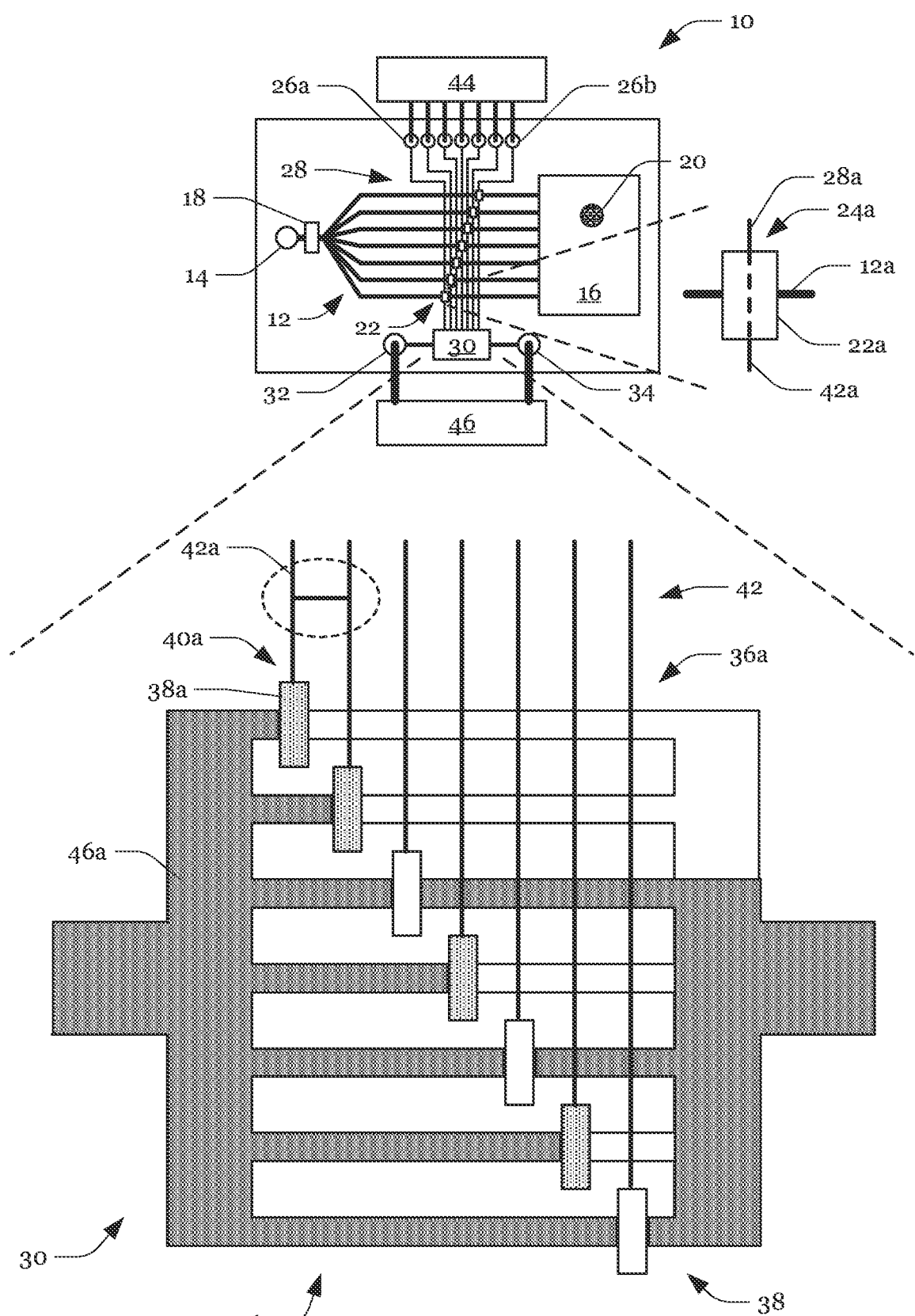

FIG. 4 schematically illustrates a test for leakage. In this test, control channels 28 are divided into two groups. One of the groups is connected to control inlet 26a and the other group is connected to inlet 26b. Pressure control unit 44 effects pressure levels at inlet 26a and inlet 26b which, in absence of defects, cause all of micromechanical valves 38 that are connected to inlet 26a to remain open and all of micromechanical valves 38 that are connected to inlet 26b to close. If leakage occurs, as shown in FIG. 5, at least one of micromechanical valves 38 will be closed (although it should remain open), as witnessed by the lack of non-transparent liquid 46a in the respective flow channel 36a. As neighboring ones of control channels 28 and neighboring ones of control channels 42 are more likely to leak to each other, neighboring ones of control channels 28 and neighboring ones of control channels 42 may be assigned to different groups. I.e., if control channels 28 extend parallelly and if control channels 42 extend parallelly, as in FIG. 5, or are otherwise placed side-by-side, each group may contain every other of control channels 28 and control channels 42, respectively.

Figure 6:
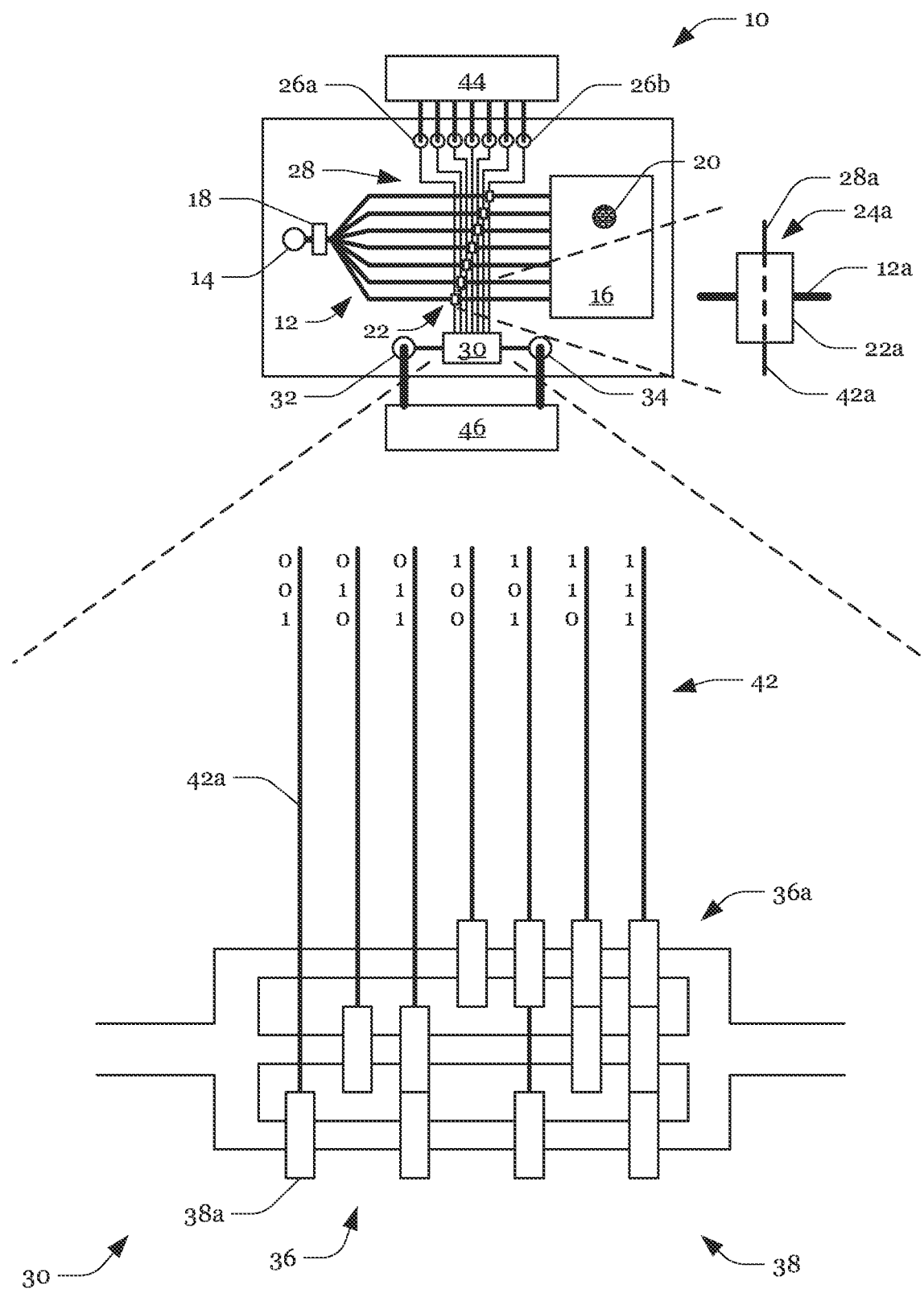
FIG. 6 schematically illustrates features of a device for microfluidic chemical and/or biological applications, according to a second example.
Figure 7:
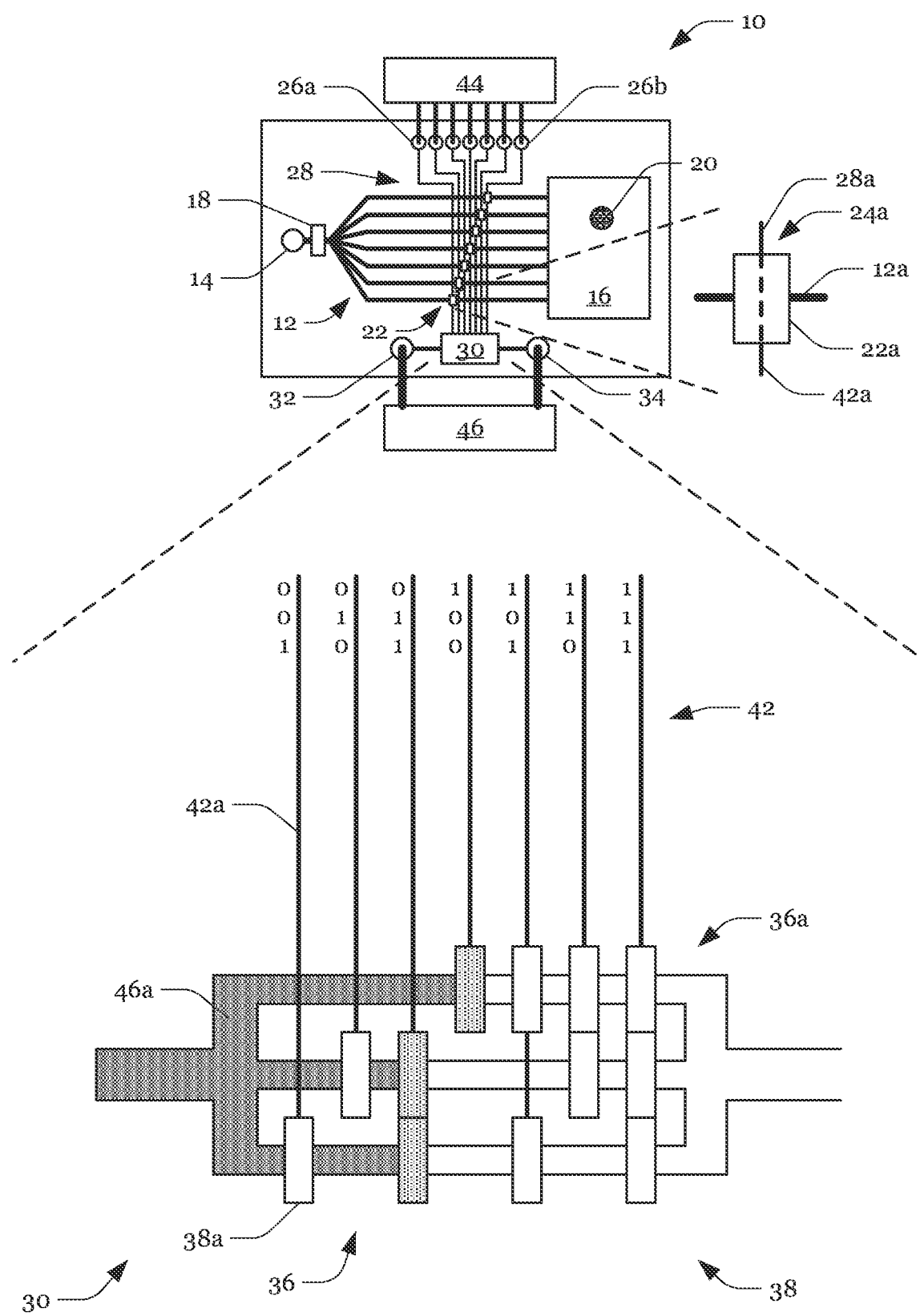
FIG. 7, FIG. 8, FIG. 9, and FIG. 10 schematically illustrate the self-test capability of the device shown in FIG. 6.
Figure 8:
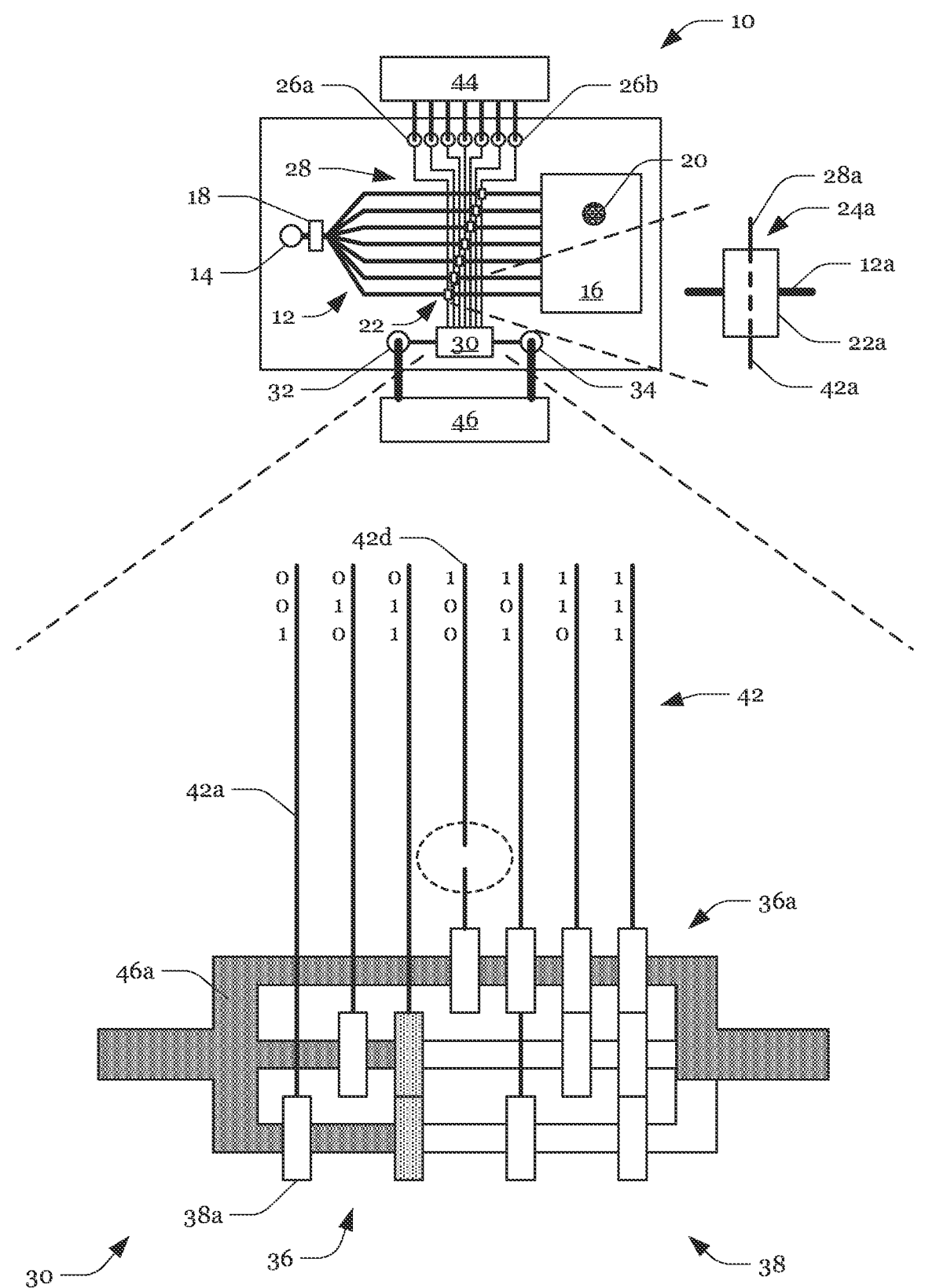

FIG. 6 shows a (more compact) design which features $[(\log)]\_2(n+1)$ fluid channels 36 instead of n fluid channels 36, with n being the number of (testable) control channels 28. If not each pressure level within control channels 28 is replicated in self-test equipment 36, the number of fluid channels 36 may also be smaller. As illustrated in FIG. 7 and FIG. 8, blockage may be tested by effecting pressure levels which, in the absence of defects, cause a valve to block one of fluid channels 36 that is not otherwise blocked. If non-transparent liquid 46a nevertheless flows through said channel, as shown in FIG. 8, system 48 may detect that either control channel 42d or the corresponding control channel of control channels 28 is blocked. As shown in FIG. 6 to FIG. 8, control channels 42 may be represented by binary numbers, wherein each binary number indicates those of fluid channels 36 that can be blocked by pressurizing the corresponding one of control channels 48. In each test of a series of tests, two of control channels 48 may be pressurized. Said two of control channels 48 may be represented by consecutive binary numbers with the lower binary number representing an odd number. Hence, in the scenario depicted in FIG. 6 to FIG. 8, the first six of channels 42 may be tested as follows:

| Test# | Channels |
| --- | --- |
| 1 | 001; 010 |
| 2 | 011; 100 |
| 3 | 101; 110 |

In this series, each control channel 28 is only pressurized one time. Channel 111 may then be tested in a separate test. As a result, the blockage test may be complete after only (about) n/2 tests.

Figure 9:
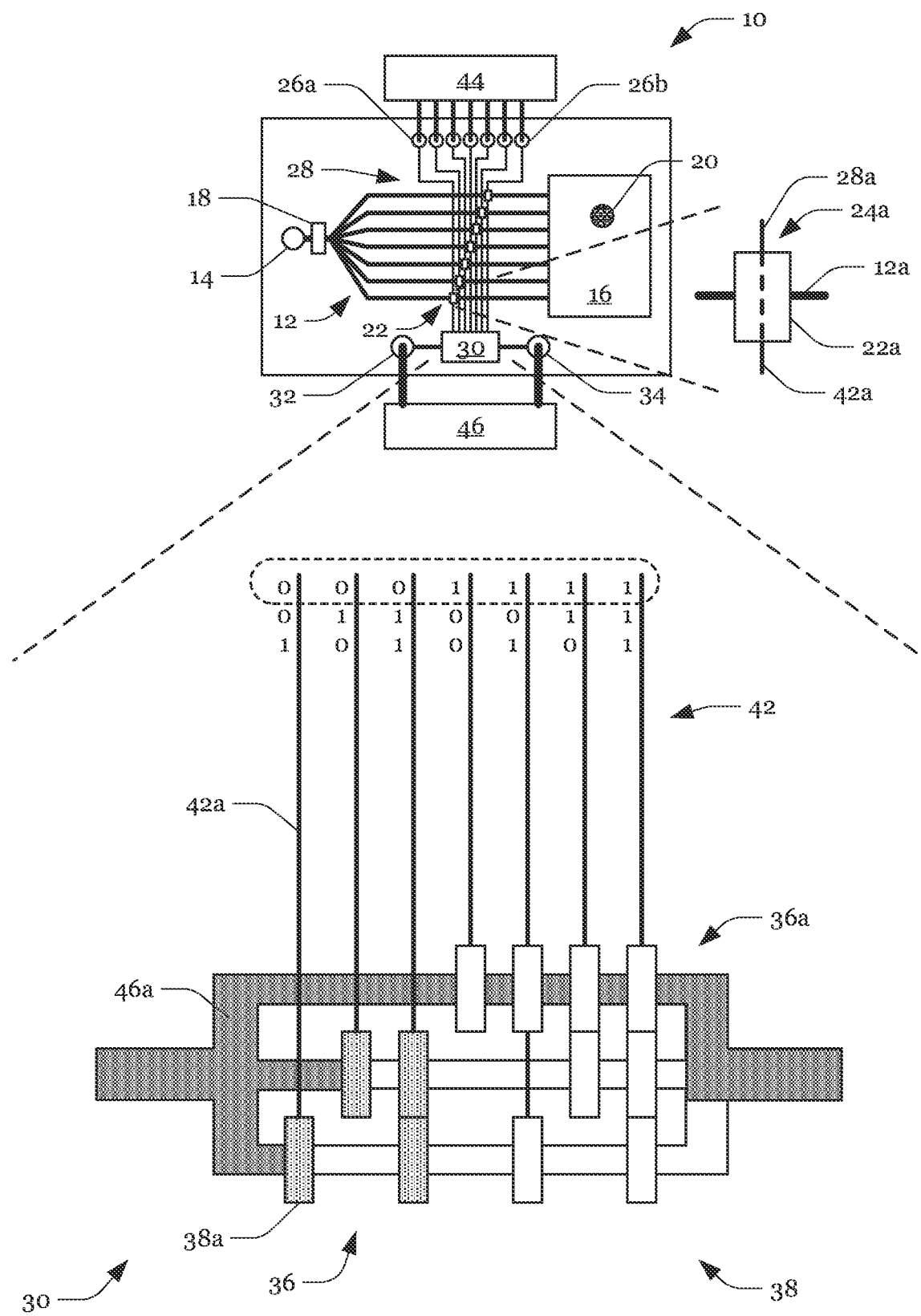
Figure 10:
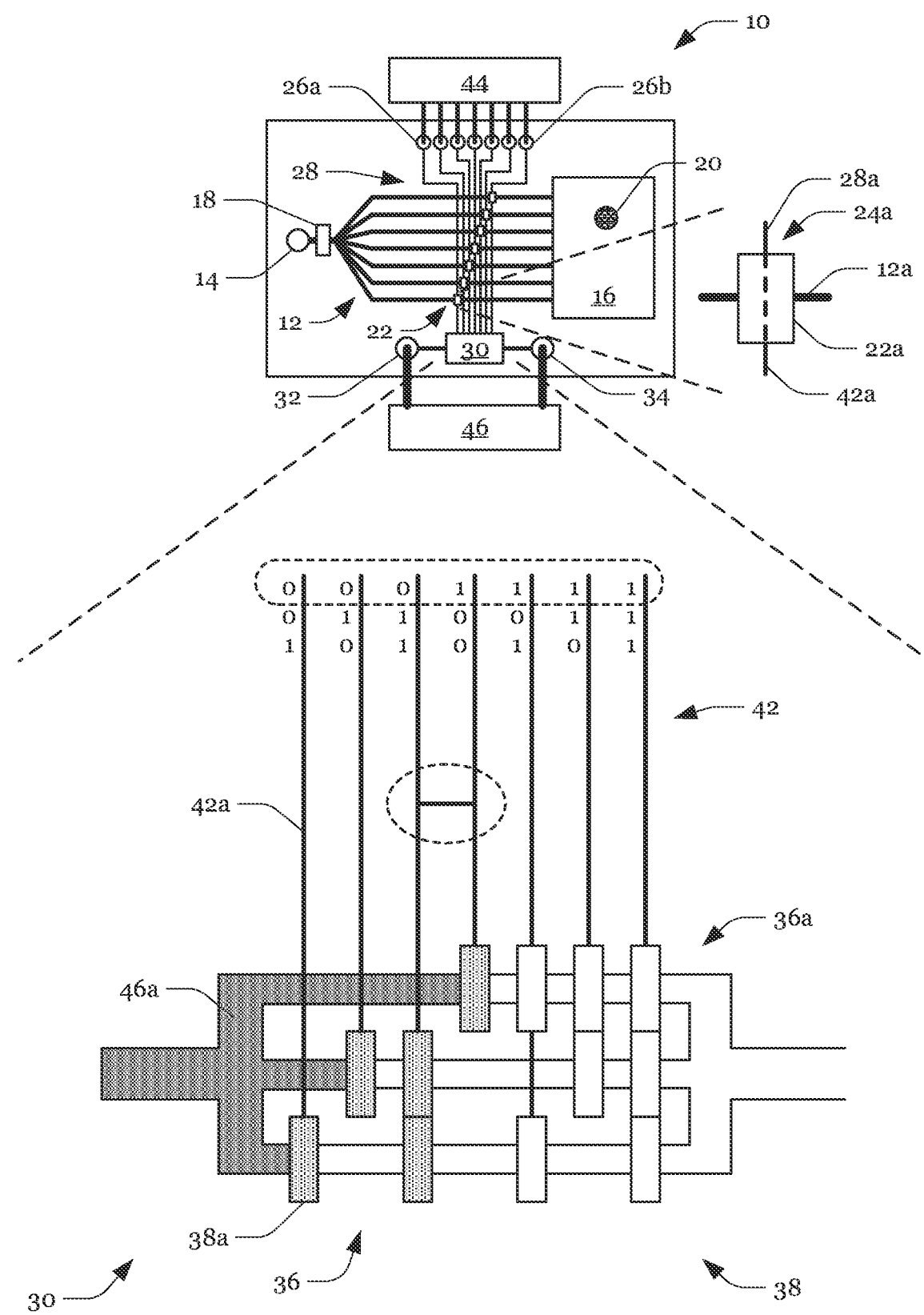

As illustrated in FIG. 9 and FIG. 10, leakage may be tested by effecting pressure levels which, in absence of defects, cause at least one of fluid channels 36 to remain un-blocked. More particularly, if, as illustrated in FIG. 10, leakage occurs between one of control channels 28 and 42, which is at a pressure level that causes a valve to close, and one of control channels 28 and 42, which would otherwise be at a pressure level that causes a valve to remain open, the corresponding fluid channel which happens to be fluid channel 36a in FIG. 10, is blocked and hence, it can be concluded that device 10 is defective. Thus, leakage may be detected by grouping all of control channels 26 that effectively control a flow through one of fluid channels 36 and testing leakage between all of control channels 26 in said group and the remaining ones of control channels 26. If leakage occurs, a flow through said one of fluid channels 36 will occur, revealing the leakage.

As shown in FIG. 9 and FIG. 10, the complements of the binary representation of control channels 42 may be used to form a matrix. Based on the matrix, a series of tests may be performed, wherein each test involves a single row of the matrix and said row indicates which ones of control channels 42 are pressurized and which ones of control channels 42 remain unpressurized. As a result, the leakage test may be complete after only $[(\log)]\_2(n+1)$ tests.

Figure 11:
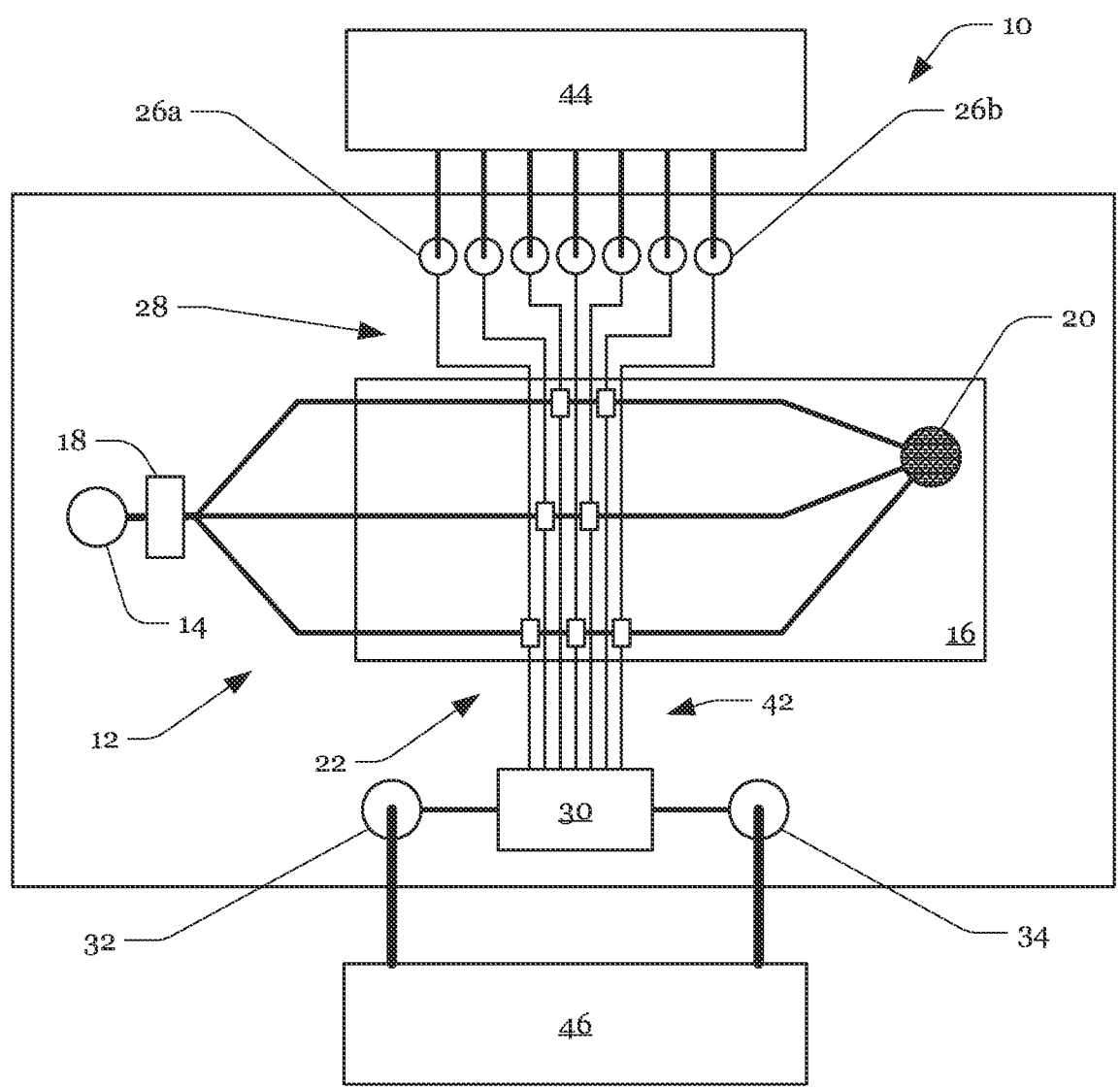
FIG. 11 schematically illustrates features of a device for microfluidic chemical and/or biological applications, according to a third example.

FIG. 11 illustrates a modification of device 10. In this example, fluid manipulation assembly 16 comprises fluid channels 12, valves 22, and reaction chambers formed by segments of channels 12. Aa a result, control channels 42 are directly connected to fluid manipulation assembly 16 and allow testing the functionality of fluid manipulation assembly 16. For instance, self-test equipment 30 allows testing whether each pair of valves 22 which delimit a reaction chamber can be correctly actuated or not.

Figure 12:
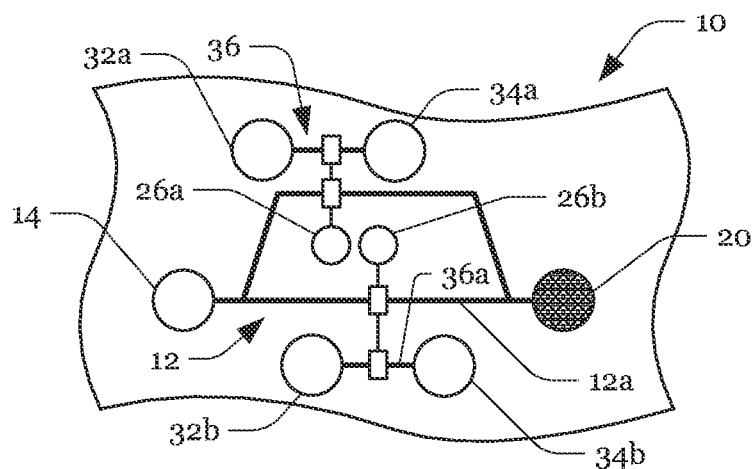
FIG. 12 schematically illustrates a possible modification of the devices shown in FIG. 1 to FIG. 12.

As illustrated in FIG. 12, not all elements of self-test equipment 30 may be grouped within a particular area of device 10 but (some or all) elements may be distributed all over device 10. If (some or all) elements of self-test equipment 30 are distributed all over device 10, self-test equipment 30 may comprise multiple inlets 32a and 32b and multiple outlets 34a and 34b. Moreover, flow channel 12a may be placed between flow channels 36 of self-test equipment 30.

Figure 14:
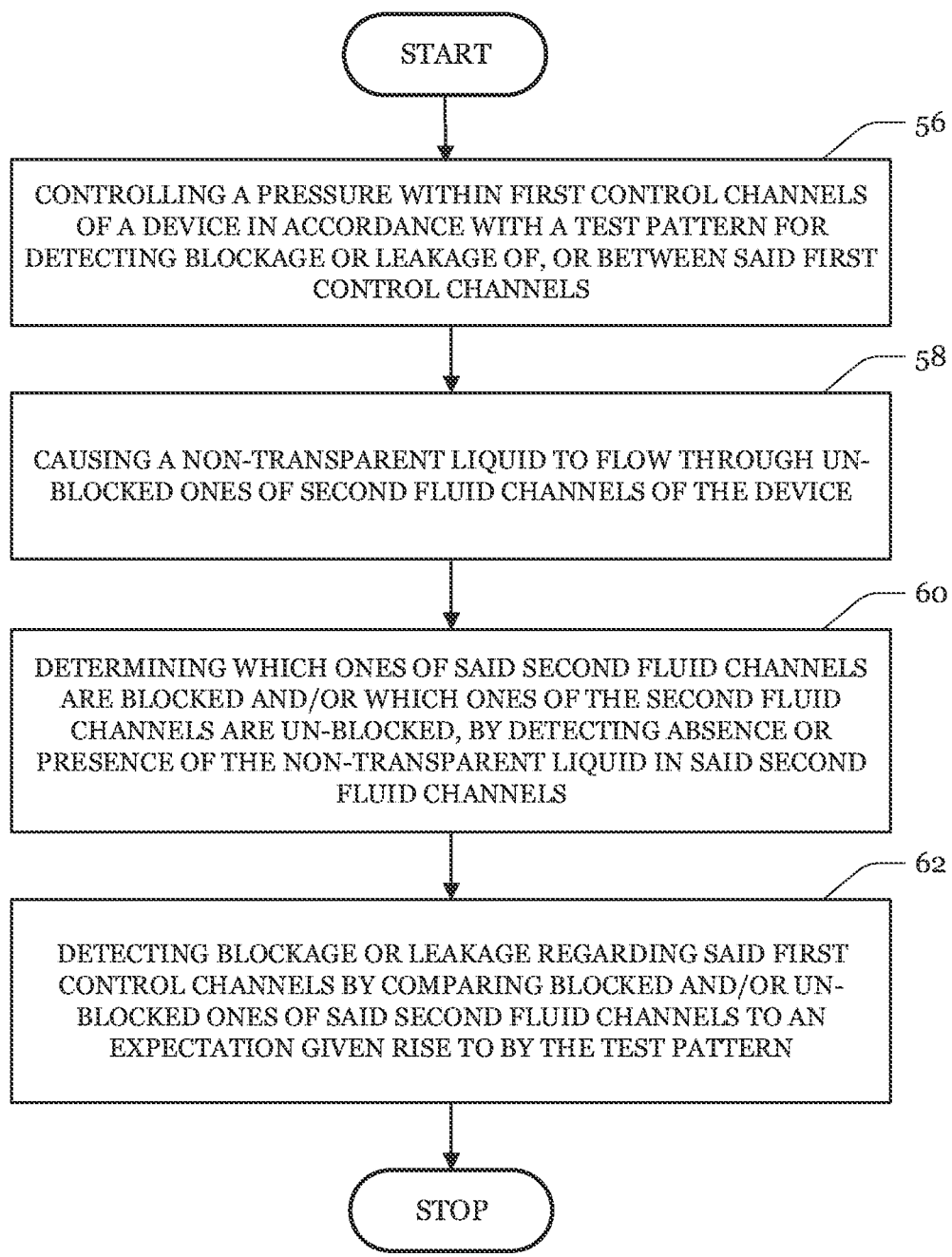
FIG. 14 shows a flowchart of the steps to determine blockage or leakage in one of the devices.

FIG. 14 shows a flowchart of the process. The process starts with step 56 of controlling a pressure within control channels 28 of device 10 in accordance with a test pattern for detecting blockage or leakage of, or between individual ones of control channels 28. The process continues at step 58 with causing non-transparent liquid 46a to flow through unblocked ones of fluid channels 36 of device 10. At step 60, the process continues by determining which ones of fluid channels 36 are blocked and/or which ones of fluid channels 36 are un-blocked, by detecting the absence or presence of non-transparent liquid 46a in individual ones of fluid channels 36. At step 62, blockage or leakage of/between control channels 28 is tested by comparing blocked and/or unblocked ones of fluid channels 36 to an expectation given rise to by the test pattern.

As the pressure propagates from control channels 28 to valves 38 of test equipment 30, defective ones of control channels 28 lead to unexpected behavior of corresponding ones of valves 38.

REFERENCE SIGNS LIST 10 device
10a substrate
10b control layer
10c fluid manipulation layer
12 fluid channels
12a fluid channel
14 fluid inlet
16 fluid manipulation assembly
18 pump
20 outlet
22 valves
22a valve
24a control port
26a control inlet
26b control inlet
28 control channels
28a control channel
30 self-test equipment
32 inlet
32a inlet
32b inlet
34 outlet
34a outlet
34b outlet
36 fluid channels
36a fluid channel
38 valves
38a valve
40a control port
42 control channels
42a control channel
42d control channel
44 pressure control unit
46 reservoir
46a liquid (non-transparent)
46b liquid (transparent)
48 system
50 apparatus
52 microscope
54 image processing device
56 step
58 step
60 step
62 step

What is claimed is:

1. A device, comprising:
a plurality of first fluid channels fluid coupled to one or more first fluid inlets;
a plurality of first valves, each of said first valves having a first control port which allows for blocking or un-blocking a flow through one of the first fluid channels based on a pressure applied to said first valve via said first control port;
a plurality of first control channels, each of said first control channels being connected to at least one of said first control ports; and
self-test equipment, featuring:
a plurality of second fluid channels;
a plurality of second valves, each of said second valves having a second control port which allows for blocking or un-blocking a flow through one of the second fluid channels based on a pressure applied to said second valve via said second control port; and
a plurality of second control channels, each of said second control channels being connected to at least one of said second control ports;
wherein each of said first control ports is fluid coupled to at least one second control port,
wherein said plurality of second fluid channels are isolated from said plurality of first fluid channels independent of whether said plurality of first valves or said plurality of second valves are in a blocking or un-blocking state.

2. The device of claim 1, wherein at least one first control port is connected to a first group of multiple second control ports.

3. The device of claim 2, wherein each of said multiple second control ports of said first group of multiple second control ports allows for blocking or un-blocking a different one of said second fluid channels.

4. The device of claim 3, wherein at least one other first control port is connected to a second group of multiple second control ports.

5. The device of claim 4, wherein each of said multiple second control ports of said second group of multiple second control ports allows for blocking or un-blocking a different one of said second fluid channels.

6. The device of claim 5, wherein said first group of multiple second control ports and said second group of multiple second control ports differ regarding the second fluid channels which they allow for to be blocked or unblocked.

7. The device of claim 6, wherein both of said first group of multiple second control ports and said second group of multiple second control ports allow for at least one second fluid channel to be blocked or un-blocked, which the other one does not allow for to be blocked or un-blocked.

8. The device of claim 1, wherein the second fluid channels are connected to one second inlet and one second outlet.

9. The device of claim 1, wherein each of said second fluid channels allows for visual inspection through a transparent wall portion of said second fluid channel.

10. The device of claim 1, wherein there are no more than n nor no more than $\log_2(n+1)$ second fluid channels, with n being the number of first control channels under test.

11. The device of claim 1, wherein the first and second fluid channels and the first and second control channels are integrated into a single chip.

12. The device of claim 1, comprising:
a fluid manipulation assembly featuring one or more reagents.

13. The device of claim 1, wherein an area of a cross-section of the first and second fluid channels and the first and second control channels is below 1 mm$^2$.

14. A system, comprising:
a device comprising:
a plurality of first fluid channels connected to one or more first fluid inlets;
a plurality of first valves, each of said first valves having a first control port which allows for blocking or un-blocking a flow through one of the first fluid channels based on a pressure applied to said first valve via said first control port;
a plurality of first control channels, each of said first control channels being connected to at least one of said first control ports; and
self-test equipment, featuring:
a plurality of second fluid channels;
a plurality of second valves, each of said second valves having a second control port which allows for blocking or un-blocking a flow through one of the second fluid channels based on a pressure applied to said second valve via said second control port; and
a plurality of second control channels, each of said second control channels being connected to at least one of said second control ports;
wherein each of said first control ports is connected to at least one second control port;
wherein the system is configured to:
pressurize/de-pressurize selected ones of the first control channels;
determine which ones of the second fluid channels are blocked and/or which ones of the second fluid channels are un-blocked, by visually detecting absence or presence of fluid flow through said second fluid channels; and
detect blockage or leakage regarding said first control channels by comparing an expected absence/presence pattern with an actual absence/presence pattern.

15. A method, comprising:

controlling a pressure within said first control channels of a device according to claim 1 in accordance with a test pattern for detecting blockage or leakage of, or between said first control channels;
causing a non-transparent liquid to flow through un-blocked ones of said second fluid channels of the device;
determining which ones of said second fluid channels are blocked and/or which ones of the second fluid channels are un-blocked, by detecting absence or presence of the non-transparent liquid in said second fluid channels; and
detecting blockage or leakage regarding said first control channels by comparing blocked and/or un-blocked ones of said second fluid channels to an expectation given rise to by the test pattern.

16. The device of claim 1, wherein an area of a cross-section of the first and second fluid channels and the first and second control channels is below 100 µm$^2$.

17. The device of claim 1, wherein an area of a cross-section of the first and second fluid channels and the first and second control channels is below 10 µm$^2$.

18. The device of claim 1, wherein the device allows for concurrently flowing a first fluid through said first fluid channels and a second fluid through said second fluid channels, the first fluid and the second fluid being different from, and independent of, each other.

19. The device of claim 1, wherein the device allows for visually detecting absence or presence of fluid flow through said second fluid channels.

20. The device of claim 1, wherein each of said first control channels controls a different set of second control valves, each of said sets comprising one or more of said second control valves.

21. The device of claim 1, wherein the device allows for independently operating said first control channels.

22. The device of claim 1, wherein the device comprises a substrate and said first fluid channels are formed in a first layer of material deposited on the substrate and said second fluid channels are formed in a second layer of material deposited on the substrate, wherein the first layer and the second layer are non-overlapping layers that are vertically stacked on the substrate.

23. The device of claim 1, wherein at least a portion of each of said plurality of first fluid channels are spaced apart so that a fluid that flows through one of said plurality of first fluid channels cannot flow through another of said plurality of first fluid channels.

24. The device of claim 1, wherein said plurality of first fluid channels are fluid coupled together in parallel.

25. The device of claim 1, wherein each of said first control ports is fluid coupled to a separate corresponding one of said second control ports.

* * * * *